United States Patent [19]

Welp et al.

[11] Patent Number: 5,003,349

[45] Date of Patent: Mar. 26, 1991

[54] FILM CARD CAMERA AND METHOD FOR PREPARING AND PRINTING ORIGINAL AND DUPLICATE FILM CARDS WITH SILVER FILM

[75] Inventors: Ulrich Welp, Bad Nauheim; Willi Kramer, Bad Vilbel, both of Fed. Rep. of Germany

[73] Assignee: Microbox Filmdatenbank GmbH, Bad Nauheim, Fed. Rep. of Germany

[21] Appl. No.: 508,205

[22] Filed: Apr. 12, 1990

[30] Foreign Application Priority Data

Apr. 28, 1989 [DE] Fed. Rep. of Germany ....... 3914066

[51] Int. Cl.⁵ ............................................. G03B 27/30
[52] U.S. Cl. .................................................. 355/100
[58] Field of Search ................... 355/100, 103, 19, 43, 355/40, 85

[56] References Cited

U.S. PATENT DOCUMENTS 3,535,039 10/1970 Lakin et al. ......................... 355/100
4,634,269 1/1987 Welp et al. .......................... 355/100

Primary Examiner—L. T. Hix
Assistant Examiner—Khanh Dang
Attorney, Agent, or Firm—Wegner, Cantor, Mueller & Player

[57] ABSTRACT

A film card camera has a T-shaped camera housing. In a rear housing area leading to a support column, there are provided four development stations aligned in tandem. A transverse conveyor transports film cards exposed in an exposure station to an unoccupied development station, and, after development, transports the film cards back to the front housing area. A contact exposure station is provided in the front housing area, so that duplicate cards can be produced in the film card camera. For the printing of duplicate cards, a specific card is identified in a reading station, and the data to be printed is retrieved from a memory.

8 Claims, 1 Drawing Sheet

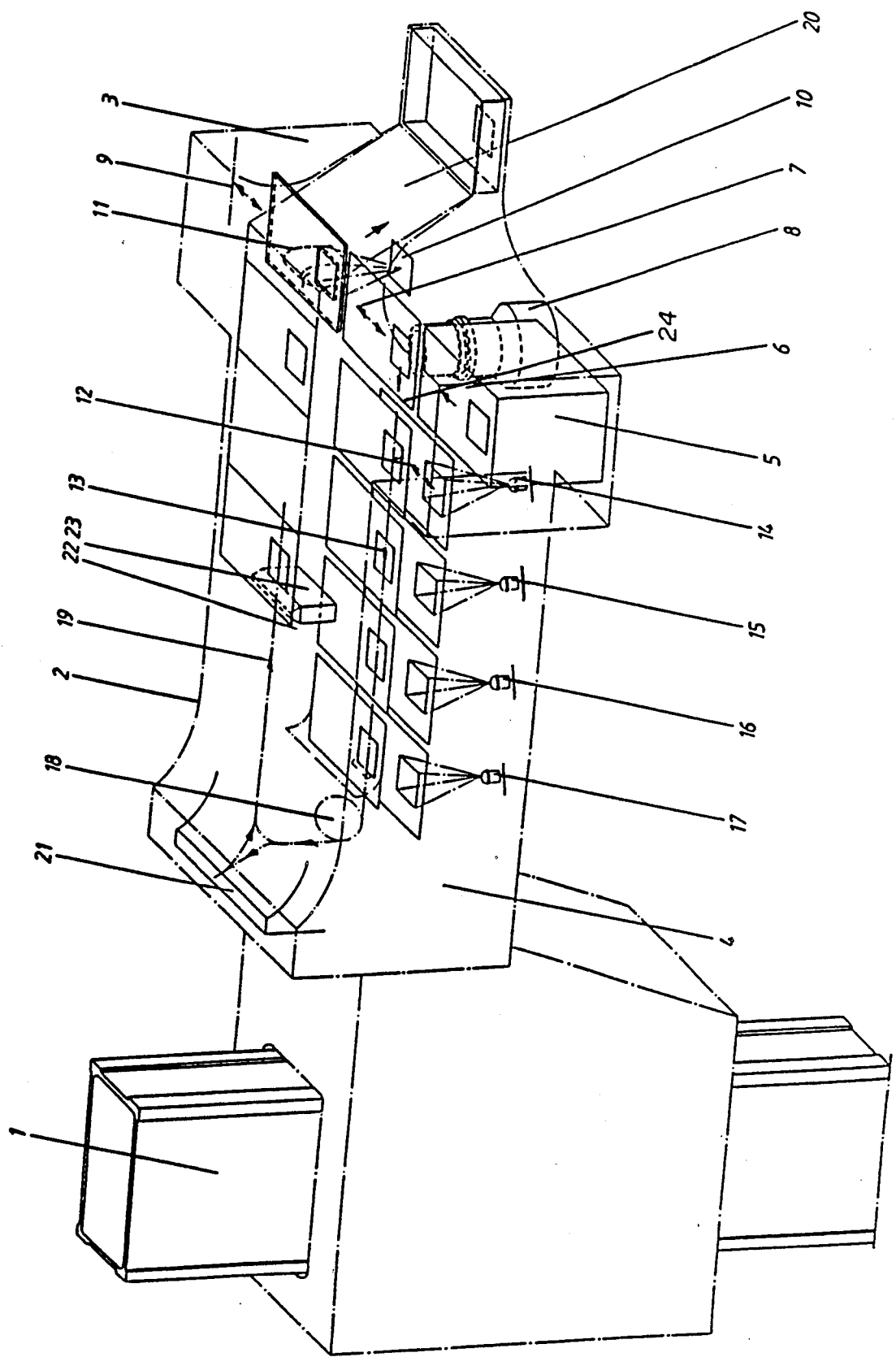

FILM CARD CAMERA AND METHOD FOR PREPARING AND PRINTING ORIGINAL AND DUPLICATE FILM CARDS WITH SILVER FILM

BACKGROUND OF THE INVENTION

This invention relates to a film card camera comprising a camera housing, which is securable in a cantilever manner to a vertical column, a film card inlet, an exposure station, and a development station. Such a film card camera is disclosed in U.S. Pat. No. 4,634,269, incorporated herein by reference.

This invention further relates to a method for preparing and printing either original or duplicate film cards with silver film.

The film card camera according to U.S. Pat. No. 4,634,269 has only a single development station. Since the developing, fixing, and washing of exposed film requires a relatively long time, known film card cameras operate relatively slowly.

In order to expose and develop film cards quickly and in succession, DE-PS-3,245,333 has provided a film card camera with two development stations such that these two development stations are alternately supplied with exposed film cards. The development stations are positioned on both sides of the exposure station. Therefore, this film card camera is required to be relatively long in length. If a duplication station was additionally provided for this film card camera, then an even greater length would be necessary. Further, if this film card camera were to include four development stations, rather than two, then the length of the film card camera would be extended even further. This resultant increased length would then lead to difficulties in arranging lamps for illuminating the documents to be photocopied. Furthermore, the additional development stations and duplicating station would increase the weight of the film card camera. Since it is usually held in a height-adjustable, cantilever manner to a vertical column, the film card camera would project relatively far from the column. Therefore, the column would have to support a large angular force, resulting in difficulties.

SUMMARY OF THE INVENTION

The above problems are solved by the present invention. The film card camera of the present invention includes several development stations, yet is as compact as possible, thus exerting the smallest possible angular force on the column supporting it. Furthermore, the present invention provides a practical method for preparing and printing duplicate film cards, as well as original film cards, with this film card camera.

The film card camera according to this invention comprises a camera housing, which is T-shaped as seen from above, wherein several development stations are aligned in tandem in the area of the housing near the column. In this rear area of the housing, there is also provided a transverse conveyor to transport the film cards from a front area of the housing to the individual development stations, and subsequently to transport the cards to an outlet at the front housing area. At the front housing area, there is provided a film card inlet and an exposure station aligned perpendicularly with respect to the development stations, and linked to each other by a transport means. Also, in this front housing area near the exposure station, a transfer means supplies film cards to the transverse conveyor.

In the present invention, the length of the housing between the film card camera and the column, which is already necessary, is used for the development stations. Therefore, the apparatus can be made small enough so that no problems result from the arrangement of the lamps which illuminate the document.

Additionally, the forces exerted on the column by the weight of the development stations is reduced, since their distance from the column is smaller than in previously known devices.

In a preferred embodiment, the transverse conveyor is a belt conveyor comprising a lower strand and an upper strand. The lower strand feeds the film cards from the front housing area to the individual development stations, and then the upper strand feeds the film cards back to the front housing area. In this manner, the finished film cards arrive at the film card outlet in non-reversed fashion, and expensive turning mechanisms, such as those employed in DE-OS-3,329,806, are not necessary.

In another embodiment of the present invention, inscription of the film cards can be performed within the film card camera apparatus itself. By providing the inscription station, such as a labeler, for the film cards in the path of the upper strand of the transverse conveyor, the size of the camera is further minimized. Since the inscription of the film cards occurs only after exposure and development, the exposure of a film card can occur immediately after the placement of a document. In the present invention, there is no need to wait for the relatively lengthy printing time as in prior film card cameras equipped with a printing unit. Moreover, a buffer can be provided before the printing station so that lengthy printing times do not interrupt the work flow.

According to another embodiment of the present invention, duplicate cards can also be produced if a master card inlet is provided in the front housing area, at an end of the front housing area opposed to the film card inlet In this embodiment, a contact exposure station is provided between the master card inlet and the exposure station. By providing the development stations in the rear housing area, there is sufficient space in the front housing area for both the contact exposure station and the master card inlet.

For printing duplicate cards, printing must be performed on the opposite side of the duplicate film card than with original cards. This requirement could be met by providing one printing unit for each of the two types of cards, wherein the two printing units are opposed to each other. However, it is preferred that the inscription station is provided with a single printing unit on the bottom of the upper strand of the transverse conveyor, and a turning station for the film cards is provided before the inscription station to allow the inscription station to be used for printing of both duplicate cards and original cards.

The reading of data from the master film cards, required for the inscription of duplicate cards, can be performed in the film card camera if a reading station is provided in the front housing area, such that reading of the master film cards is performed prior to the master card reaching the contact exposure station.

It is preferred that this reading station is designed to read an identification code on the film part of each film card. Thus, by controlling the inscription station with electronic data memory, the data to be printed is identified by the identification code.

Thus, the film card camera according to the present invention can serve as a combination of a film card camera and a duplicator if it is provided with a contact exposure station, a reading station and an inscription station. It can be used to produce, in rapid sequence, sets of original or duplicate silver-film data cards which contain optical machine-readable characters as coding or as inscription on the entire area of the card.

In another aspect of the invention, there is provided a method for preparing and printing original and duplicate film cards with silver film in a film card camera which comprises an inscription station. For preparing and printing original cards, the data to be printed is first stored in an electronic data memory under an address assigned to the relevant film card. When the film card is printed, an identification code for identifying the address is printed on the card. For the printing of duplicate cards, the identification code is read by means of a reading station and then assigned to the print data. In this method for printing an original card, the data to be printed is retrieved from the data memory.

When duplicate cards are to be prepared, the text of the code or of the inscription of the original card is read at the reading station, and then the data to be printed is retrieved from the data memory for printing duplicate cards at the printing station.

This invention provides numerous embodiments. A preferred embodiment is illustrated in the drawing and described as follows.

BRIEF DESCRIPTION OF THE DRAWING

FIG. 1 schematically illustrates a film card camera according to the present invention.

Illustrated in the Figure is a column 1 on which a camera housing 2, T-shaped as seen from above, of the film card camera of the present invention is disposed in a height-adjustable manner. The camera housing 2 consists of a front housing area 3, and a rear housing area 4 leading to the column 1. Provided on the left side of the front housing area 3 is a film card inlet 5, in which a stack of unexposed film cards 6, can be inserted. These film cards 6 are individually transported by a transport means 7 to an exposure station 8.

On the side of the front housing area 3 opposite the film card inlet 5, there is provided a master card inlet 9 from which master cards can be supplied to a contact exposure station 10. Before reaching the contact exposure station 10, an inserted master card travels through a reading station 11, where the text printed on it is automatically read. After the contact exposure, the transport means 7 enables the master card to be transported back to the master card outlet 9. The exposed duplicate cards are conveyed to the exposure station 8 by the transport means 7.

From the exposure station 8, either the exposed film cards, or the exposed duplicate cards, are fed by means of a transfer means 24 to a transverse conveyor 12 in the rear housing area 4. The transverse conveyor 12 consists of a circulating belt with a lower strand 13 and an upper strand 19. The lower strand 13 moves the film cards 6 past four development stations 14, 15, 16, 17 aligned in tandem in the rear housing area 4. Before the first unoccupied development station 14, 15, 16, 17, the particular film card is released from the lower strand 13 and pushed into the first unoccupied development station 14, 15, 16, 17. After development, it is again entrained by the lower strand 13. After passing a rear deflection roller 18, it passes on the upper strand 19 of the transverse conveyor 12, and subsequently returns to the front housing area 3, where a film card outlet 20 is located at the end of the transverse conveyor.

In the area of the deflection roller 18, there is further provided a turning station 21. This allows for optionally feeding cards to an inscription station 22 so that either side of the card, as desired, faces upward when it reaches the inscription station 22. The inscription station 22 is provided with a printing unit 23, located under the upper strand 19.

If duplicate cards are to be produced with the described film card camera, then the identification code on the master card is read by the reading station 11. Then, the data to be printed on the corresponding duplicate card is retrieved from an electronic memory. Therefore, the reading station does not have to read the text printed in OCR type on the master card.

We claim:

1. A film card camera supportable in a cantilever manner to a vertical column, which is generally T-shaped as seen from above, said film card camera comprising:

a camera housing composed of a front housing area and a rear housing area, said rear housing area being disposed near the vertical column;

a plurality of development stations aligned in tandem in the rear housing area;

a transverse conveyor in the rear housing area for transporting film cards from the front housing area to the individual development stations, and from the individual development stations to a film card outlet in the front housing area;

a film card inlet and an exposure station in the front housing area, said film card inlet and said exposure station aligned in tandem perpendicularly with the alignment of the plurality of development stations and linked to each other by a transport means; and a transfer means in the front housing area for supplying film cards from the front housing area to the transverse conveyor.

2. A film card camera according to claim 1, wherein the transverse conveyor is a belt conveyor comprising a lower strand, which feeds film cards to the individual development stations, and an upper strand, which feeds film cards into the front housing area.

3. A film card camera according to claim 2, further comprising an inscription station along the upper strand of the transverse conveyor.

4. A film card camera according to claim 3, further comprising a master card inlet in the front housing area at an end of the front housing area opposite the film card inlet; and a contact exposure station between the master card inlet and the exposure station.

5. A film card camera according to claim 4, further comprising a reading station for reading data from a master card to be printed by the inscription station during duplication, wherein the reading station is provided in the front housing area between the contact exposure station and the master card inlet.

6. A film card camera according to claim 5, wherein the reading station reads an identification code on a film part of each master film card, and the inscription station is controlled by an electronic data memory, so that printing of data is assigned by the read identification code.

7. A film card camera according to claim 3, wherein the inscription station comprises a printing unit on a bottom side of the upper strand.

8. A film card camera according to claim 7, further comprising a turning station for turning film cards provided before the inscription station.

* * * * *